(12) United States Patent
Sakurai

(10) Patent No.: US 6,625,097 B1
(45) Date of Patent: Sep. 23, 2003

(54) RECORDED MEDIUM REPRODUCING APPARATUS

(75) Inventor: Jun Sakurai, Fukushima (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/535,954

(22) Filed: Mar. 27, 2000

(30) Foreign Application Priority Data

Mar. 26, 1999 (JP) .......................................... 11-084296

(51) Int. Cl.⁷ ................................................ G11B 7/00
(52) U.S. Cl. ..................................... 369/53.2; 369/30.2
(58) Field of Search ............................. 369/30.8, 30.81, 369/30.83, 30.84, 30.85, 30.91, 30.93, 30.4, 30.76, 30.14, 30.15, 30.16, 30.17, 30.18, 30.2, 30.24, 53.1, 53.2

(56) References Cited

U.S. PATENT DOCUMENTS

| 5,115,419 A | * | 5/1992 | Akiyama et al. ........ 369/30.91 |
| 5,293,362 A | | 3/1994 | Sakurai et al. ................ 369/30 |
| 6,052,342 A | * | 4/2000 | Yoshimura ............... 369/30.85 |

FOREIGN PATENT DOCUMENTS

| EP | 0 691 652 A1 | 1/1996 |
| JP | 61-184766 | 8/1986 |
| JP | 5-128693 | 5/1993 |
| JP | 10-228718 | 8/1998 |

OTHER PUBLICATIONS

Patent Abstract of Japan, vol. 1997, No. 08, Aug. 29, 1997, JP 09 091852 A (Matsushita Electric Ind. Co., Ltd), Apr. 4, 1997.

* cited by examiner

*Primary Examiner*—Thang V. Tran
*Assistant Examiner*—Bach Vuong
(74) *Attorney, Agent, or Firm*—Dickstein Shapiro Morin & Oshinsky LLP

(57) ABSTRACT

A recorded medium reproducing apparatus that is capable of loading a plurality of various types of recorded media, and is such that it is possible to simultaneously display, in an easy-to-understand form for the user, for each recorded-medium accommodating unit whether or not it contains a recorded medium, and the type of recorded medium accommodated.

7 Claims, 7 Drawing Sheets

FIG. 3A
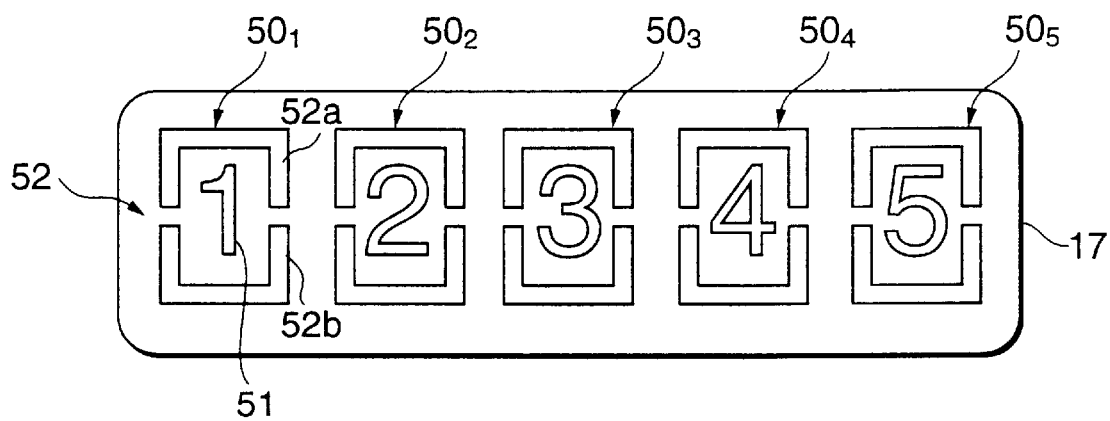
FIG. 3B
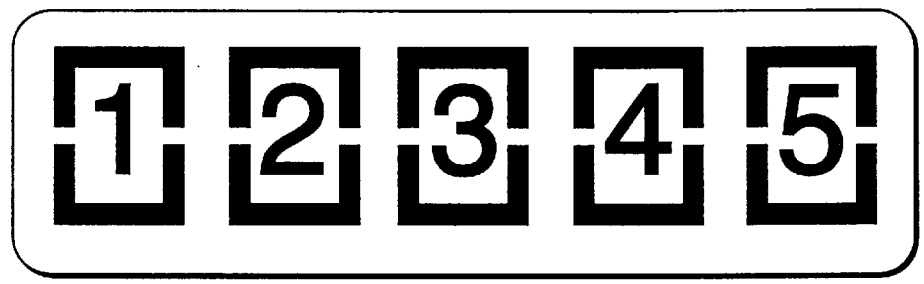
FIG. 3C   FIG. 3D   FIG. 3E   FIG. 3F
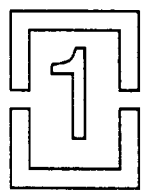   

FIG. 4A
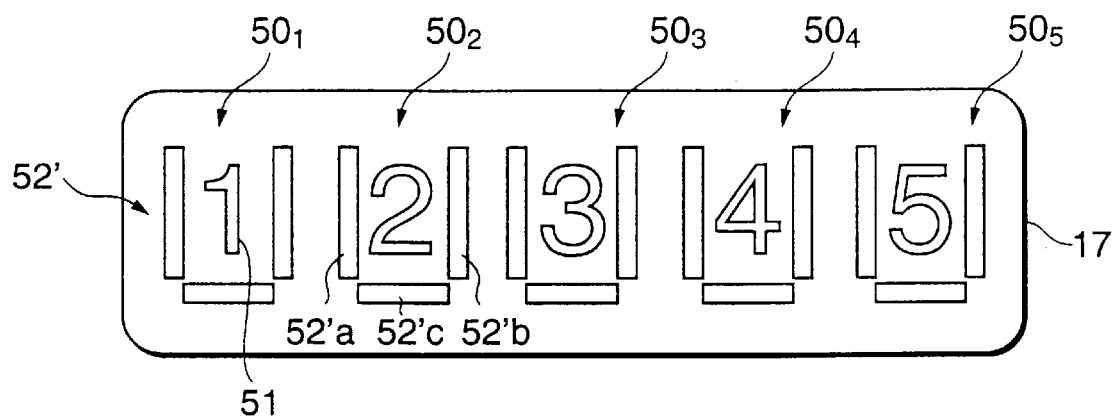
FIG. 4B
FIG. 4C  FIG. 4D  FIG. 4E  FIG. 4F
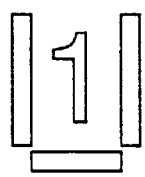   

US 6,625,097 B1

RECORDED MEDIUM REPRODUCING APPARATUS

BACKGROUND OF THE INVENTION

1. Field of the Invention

This invention relates to a recorded medium reproducing apparatus for reproducing recorded medium such as optical discs, for example DVD (Digital Versatile Disc) or CD (Compact Disc).

2. Description of Related Art

Some examples of optical disc reproducing apparatuses are CD players, video CD players or DVD video players. An apparatus that allows for two or more optical discs to be loaded in these kinds of players is normally called a changer, and it makes it possible to reproduce, in succession, several optical discs. There is a type of changer which holds a plurality of optical discs in a disc holder which is equipped inside the optical disc reproducing apparatus and has a plurality of disc accommodating units, and there is a type of changer which holds a plurality of optical discs in a disc holder which has a detachable adapter that allows it to be removed from the reproducing apparatus and has a plurality of disc accommodating units. Each of the disc accommodating units in the disc holder is assigned a channel number. When the changer reproduces in sequence the optical discs, an FL (fluorescent) display lamp on each disc accommodating unit indicates whether or not a corresponding disc accommodating unit contains an optical disc. For example, in a case of a changer that is equipped with a disc holder capable of holding five optical discs, there is an FL display lamp for each disc, DISC1, DISC2, DISC3, DISC4 and DISC5. Normally, in the initial state of the changer when detecting whether or not there are optical discs, all of the display lamps light up. As soon as it is detected that there is no optical disc, the FL display lamp corresponding to the channel number of that disc accommodating unit goes OFF.

FIGS. 7A thru 7C show one example of the display unit of a conventional changer. Here the display unit comprises FL display lamps.

FIG. 7A shows when all lamps are OFF and FIG. 7B shows when all lamps are ON. The numbers 1 to 5 in FIG. 7 indicate the channel numbers that are assigned to the disc accommodating units. In the initial state, all of the lamps are lit up as shown in FIG. 7B. Each disc accommodating unit is judged whether or not it contains an optical disc, and as a result, the FL display lamps for channel numbers corresponding to disc accommodating units that were judged to contain no optical disc go OFF. In the example shown in FIG. 7C, it indicates that there is no optical disc in the disc accommodating unit that corresponds to channel number 2, and in the disc accommodating unit that corresponds to channel number 5.

SUMMARY OF THE INVENTION

Generally, DVD players are capable of reproducing CD discs as well as DVD discs. Also, optical disc apparatuses that are capable of loading a plurality of various kinds of optical discs, or in other words, changers that are capable of handling various kinds of optical discs, are being sold commercially.

However, this kind of conventional changer did not take into consideration simultaneously displaying the information of whether or not there are optical discs in the disc accommodating units for each respective channel number of the disc holder, and the information of what kind of optical discs there are.

Therefore, when this kind of conventional changer reproduces optical discs loaded in the disc accommodating units of the disc holder, it was necessary for users to perform the troublesome work of checking what kind of optical disc loaded into the disc accommodating units for all of the channel numbers.

Japanese patent publication No. S61-184766 discloses an optical information recording/reproducing apparatus having detection means for detecting whether or not there is a disc, and the size of the disc or the type, and display means for displaying whether or not there is a disc, and the size of the disc or the type based on the detection results at the detection means. Also, Japanese patent publication No. H10-228718 discloses an optical disc apparatus having a disc judgment circuit which uses a signal obtained from the reflected beam reflected from an optical disc to determine the kind of the optical disc, and an optical disc display circuit that displays the kind of the optical disc that is mounted.

However, these apparatuses described in these publications are for reproducing only a single disc, and in a case of optical disc reproducing apparatuses which are capable of loading a plurality of various kinds of optical discs, they do not display whether or not there is an optical disc and the optical disc type for each disc accommodating unit. They do not take into account simultaneously displaying in a form that is easy for the user to understand whether or not there is an optical disc and the optical disc type for each disc accommodating unit.

In consideration of the aforementioned problem, an object of this invention is to provide a recorded medium reproducing apparatus (changer) that is capable of loading a plurality of recorded media of various kinds: wherein the apparatus is capable of simultaneously displaying in a form that is easy for the user to understand the relation between information of whether or not there is recorded medium loaded in recorded medium accommodating unit and information of the kind of recorded medium for each recorded medium accommodating unit.

In order to accomplish the above-mentioned object, the present invention provides a recorded medium reproducing apparatus capable of loading a plurality of recorded media of various kinds, comprising:

holding means having a plurality of accommodating units for accommodating recorded media, recorded medium detection means for detecting whether or not there is a recorded medium accommodated in each of the accommodating units, medium-type detection means for detecting the kind of the recorded medium that was detected to be accommodated in the accommodating unit by the recorded medium detection means, and display means for displaying detection results of the recorded medium detection means and the medium-type detection means with regard to each of the plurality of accommodating units, respectively, wherein:

the display means comprises a first display portion for displaying the detection result of the recorded medium detection means and a second display portion for displaying the detection result of the medium-type detection means, which are located in close proximity to each other and provided for each of the plurality of accommodating units.

In a case of the recorded medium reproducing apparatus of the present invention being capable of reproducing two kinds of optical discs, for example, the medium-type detection means is capable of detecting the type of optical discs accommodated in the accommodating units by irradiating a laser beam on an optical disc accommodated in an accommodating unit and reading the table of contents (TOC).

Moreover, the first display portion of the display means displays whether or not a recorded medium is accommodated in the accommodating unit that corresponds to the first display portion concerned, as well as the channel number assigned to the accommodating unit that corresponds to the first display portion concerned.

Furthermore, the second display portion of the display means may comprise a plurality of display segments. In this case, by changing the display mode of the display segments for each type of recorded medium, it is possible to display the kind of recorded medium that is accommodated in the accommodating unit corresponding to the second display portion concerned. In addition, the second display portion can be located so as to surround the first display portion that corresponds to the accommodating unit corresponding to the second display portion concerned.

BRIEF DESCRIPTION OF THE DRAWINGS

FIGS. 3A to 3F are drawings explaining an example (first example) of the DVD video player to which the present invention is applied;

FIGS. 4A to 4F are drawings explaining an example (second example) of the DVD video player to which the present invention is applied;

DETAILED DESCRIPTION OF THE PREFERRED EMBODIMENTS

An optical disc reproducing apparatus to which an embodiment of the present invention is applied will be explained in reference of a DVD video player as an example.

Figure 1:
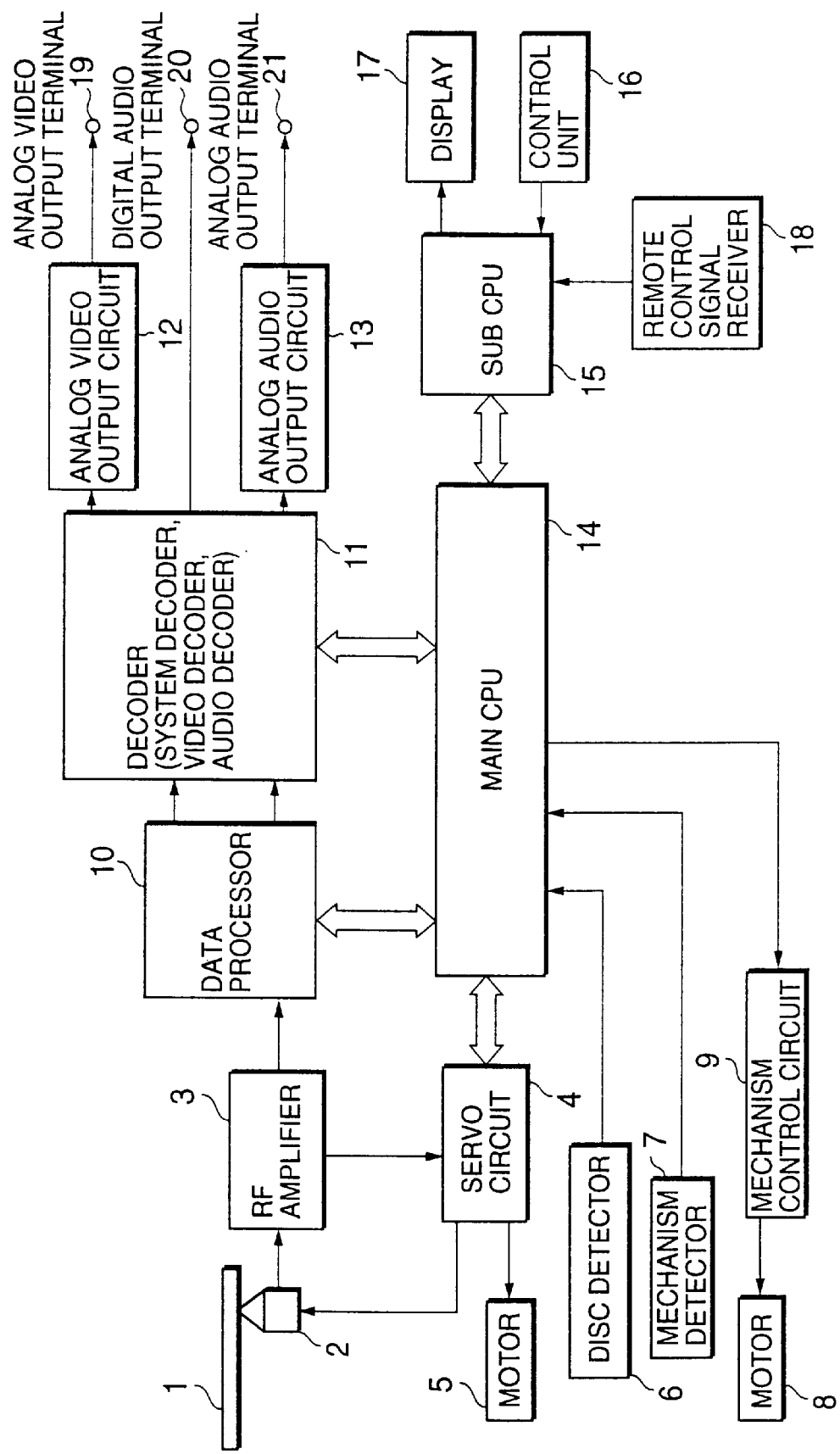
FIG. 1 is a block diagram giving an outline of a DVD video player to which the present invention is applied.

FIG. 1 is a block diagram giving an outline of a DVD video player to which the present invention is applied.

In FIG. 1, reference numeral 1 refers to a DVD video disc, 2 to an optical pick up, 3 to an RF amplifier, 4 to a servo circuit, 5 and 8 to motors, 6 to a disc detector, 7 to a mechanism detector, 9 to a mechanism control circuit, 10 to a data processor, 11 to a decoder, 12 to an analog video output circuit, 13 to an analog audio output circuit. 14 to a main control unit (main CPU), 15 to a sub control unit (sub CPU), 16 to a control unit, 17 to a display, 18 to a remote control signal receiver, 19 to an analog video output terminal, 20 to a digital audio output terminal and 21 to an analog audio output terminal.

The optical pickup 2 reads recorded data recorded on the optical disc 1 using emitted laser beam. The recorded data read by the optical pickup 2 is input to the RF amplifier 3.

The optical pick up 2 may comprise two optical pickups, one for reproducing a DVD video disc and one for reproducing a CD, or may be a single optical pickup equipped with an objective lens for reproducing a DVD video disc and an objective lens for reproducing a CD, where it is possible to switch between these objective lenses so as to reproduce both DVD video discs and CDs.

The motor 5 drives the reproducing mechanism for rotating the optical disc 1, moving the optical pickup 2 or the like. The motor 5 is not limited to a single motor serving both purposes, and there are cases where a separate motor to rotate the optical disc 1 and another separate motor to slide the optical pickup 2 are used. The motor 5 is controlled by the servo circuit 4 according to instructions from the main CPU 14.

The servo circuit 4 controls ON/OFF of the laser beam of the optical pickup 2, the tracking servo, focusing servo, focus-jumping from a recorded layer to another recorded layer, and gain of the RF amplifier 3.

The data processor 10 processes the signal output from the RF amplifier 3. In specific, when the optical disc 1 is a DVD video disc, it performs 8–16 demodulation of the DVD signal, and RS-PC (Read-Solomon Product Code) error correction. When the optical disc 1 is a CD, it performs demodulation of the CD signal.

Moreover, the data processor 10 determines whether the optical disc 1 is a DVD video disc or a CD. This judgment is performed, for example, as follows. That is, the main CPU 14 controls the motor 5 and optical pickup 2 via the servo circuit 4, and the optical pickup 2 irradiates a laser beam on the optical disc 1. In addition, it tries to read the table of contents (TOC) of the DVD video disc (or CD). The data processor 10 processes the signal output from the RF amplifier 3, and when the TOC read by the optical pickup 2 is the TOC of the DVD video disc (or CD), it determines that the optical disc 1 is a DVD video disc (or CD), otherwise it determines that the optical disc 1 is a CD (or DVD video disc). It then notifies the main CPU 14 of the result.

The decoder 11 processes the signal output from the data processor 10. In detail, for the video data output from the data processor 10, it performs demodulation of the main video signal and separation of the sub video packet and audio packet, performs NTSC/PAL encoding, performs demodulation of the sub video signal, and mixing with the main video signal, and performs processing of the on-screen display interface. Then, it outputs the video data to the analog video output circuit 12. The analog video output circuit 12 outputs the video data output from the decoder 11 to the analog video output terminal 19 as composite output, S-terminal output or component output. Also, for the audio data output from the data processor 10, it performs multi-channel demodulation, linear PCM demodulation or the like. Then, together with outputting data to the digital audio output terminal 20 in digital interface IEC-958 format, it also outputs data to the analog audio output circuit 13. The analog audio output circuit 13 performs digital to analog (D/A) conversion of the audio data output from the decoder 11, and outputs an analog audio signal to the analog audio output terminal 21.

The sub CPU 15 sends a control signal to the main CPU 14 according to a signal input from a control unit 16 that comprises keys and switches, or according to a signal transmitted by infrared light by operation of an external remote control unit and then input through a remote control signal receiver 18. In addition, the sub CPU 15 controls the display 17, and displays the disc information and operation-mode information that is transmitted from the main CPU 14.

The main CPU 14 performs overall control of all units.

Figure 2:
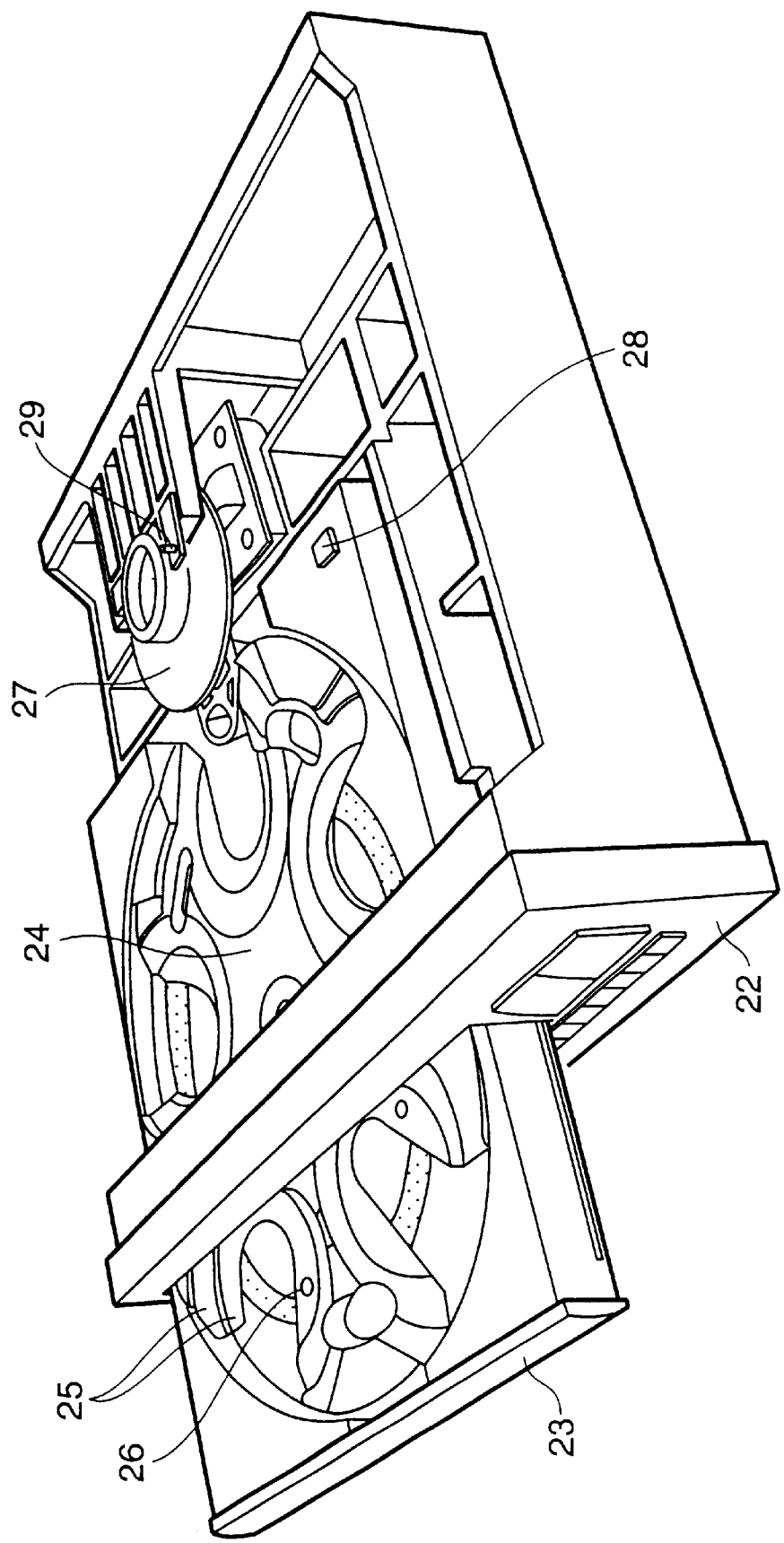
FIG. 2 is a drawing showing an example of the construction of the DVD video player to which the present invention is applied.

FIG. 2 shows a structural example of a 5-disc carrousel changer type DVD video player to which the present embodiment of the invention is applied.

In FIG. 2, reference numeral 22 refers to a front panel, 23 to a tray, 24 to a turntable, 25 to disc accommodating units, 26 to a disc detection hole, 27 to an optical disc, 28 to a light emitting element and 29 to a light receiving element.

The tray 23 is arranged such that it can be pulled out from or inserted into the front panel 22. The turntable 24 is located in the tray 23 such that it can rotate. There are five disc accommodating units 25 formed on the turntable 24, and the user can load an optical disc into a proper disc accommodating unit 25. A channel number from 1 to 5 is assigned to each of the disc accommodating units 25.

With the keys on the control panel 16 shown in FIG. 1, the user can send instructions to pull the tray 23 out, place an optical disc in a specified disc accommodating unit 25, or remove an optical disc from the disc accommodating unit. Also, the user can send an instruction to reproduce an optical disc that has been placed in the specified disc accommodating unit 25. In other words, the instructions input by the user from the control panel 16 are sent to the main CPU 14 through the sub CPU 15. In this way, the tray 23 moves out or in, or the turntable 24 turns according to instructions from the user.

Moving the tray 23 in or out, or turning the turntable 24 is performed by the mechanism control circuit 9 driving the motor 8 according to instructions from the main CPU 14 as shown in FIG. 1. In FIG. 1, the motor 8 is not just a single motor, but is each conveyance system motor for driving the tray 23 and turntable 24. The position of the tray 23 and the rotation position of the turntable 24 are detected by a mechanism detector 7. The detected data is input to the main CPU 14.

As described above, when there is an instruction from the user to reproduce an optical disc accommodated in a disc accommodating unit 25, the optical disc accommodated in that disc accommodating unit 25 is moved to and set in the disc reproduction unit.

FIG. 2 shows one optical disc 27 set in the disc reproduction unit. Before the optical disc 27 is set in the disc reproduction unit, that disc accommodating unit 25 is checked whether or not it contains an optical disc, when the disc accommodating unit 25 is positioned in the disc reproduction unit. The light emitting element 28 and the light receiving element 29 are located such that they are above and below the disc detection hole 26 formed in the disc accommodating unit 25. The light emitting element 28 and light receiving element 29 correspond to the disc detector 6 in FIG. 1, and the detection output is input to the main CPU 14.

When there is an optical disc in the disc accommodating unit 25, the light emitted from the light emitting element 28 is reflected by the optical disc and does not reach the light receiving element 29. In this case, the main CPU 14 determines that there is an optical disc. On the other hand, when the light receiving element 29 receives the light emitted from the light emitting element 28, the main CPU 14 determines that there is no optical disc.

When it is detected by the light emitting element 28 and light receiving element 29 that there is an optical disc in a disc accommodating unit 25, the type of optical disc is then determined. As described above, the main CPU 14 controls the motor 5 and optical pickup 2 through the servo circuit 4, and the optical pickup 2 irradiates a laser beam onto the optical disc 1. Then, it tries to read the TOC of the optical disc 1. The data processor 10 processes the signal that is output from the RF amplifier 3, and when the TOC read by the optical pickup 2 is the TOC of a DVD video disc, the optical disc 1 is judged to be a DVD video disc, otherwise it is judged to be a CD. The data processor 10 also notifies the main CPU 14 of the judgment result. When the main CPU 14 is notified by the data processor 10 of the judgment results about the type of the optical disc 1 (DVD video disc or CD), it controls all the other components to reproduce that kind of optical disc.

This judgment of whether or not there is an optical disc in the disc accommodating unit 25 and what type it is, may be performed as described above each time a disc is to be reproduced and for just the disc accommodating unit 25 that has been instructed to be reproduced, or it may be performed only for a disc accommodating unit 25 that has undergone change such as when the tray 23 has been pulled out or put in. Furthermore, it is also possible to perform this judgment for all of the disc accommodating units 25 by moving each disc accommodating unit 25 sequentially to the reproducing unit when starting up the DVD player.

For example, judgment of whether or not there are optical discs in all the disc accommodating units 25 and what type they are is performed when the DVD player is started up, and the results are stored in a memory (not shown in the figures). Only when there is a change for a disc accommodating unit 25, for example an optical disc is stored in or removed from the disc accommodating unit 25, or there is an instruction for the disc accommodating unit 25 to reproduce the optical disc, the judgment of whether or not there is an optical disc in the disc accommodating unit 25 and what type it is performed for that disc accommodating unit 25, and the memory can then be updated with the result. In this case, the sub CPU 15 can be made to search the memory contents, and control the display mode on the display 17 described below.

Next the display mode of the display 17 will be explained.

In the explanation below, the terms "ON" and "OFF" for a fluorescent lamp display mean that the lamp is lit up and goes OFF, respectively, however, the present invention is not limited by this. In the present invention, one of the two display modes is "ON" and the other is "OFF" and their meanings are wide. For example, for an LCD display panel, a dark display could mean "ON" and no display at all could mean "OFF", or for a color display such as an LCD panel, a red display could mean "ON" and a green display could mean "OFF", or for a multi-color display one color could mean "ON" and another color could mean "OFF". Furthermore, a continuous display could mean "ON" and an intermittent display could mean "OFF".

FIG. 3 is a drawing showing an example (first example) of the display for a 5-disc carrousel changer type DVD video player which can reproduce both DVD video discs and CD and to which this embodiment of the invention is applied.

In this example, the display 17 of this embodiment has five accommodating-unit displays $50_1$–$50_5$ corresponding to the five disc accommodating units 25, respectively. Each accommodating-unit display $50_n$ ($1 \leq n \leq 5$) comprises a channel display 51 that displays the channel number assigned to the corresponding disc accommodating unit 25, and a disc-type display 52 that is located in the vicinity of the channel display 51. The disc-type display 52 comprises two segment displays 52a, 52b that are located above and below the channel display 51 so as to surround it.

In the example shown in FIG. 3, the display 17 is a fluorescent lamp display, however, for example, it may also be an LED or an LCD panel.

FIG. 3A shows when all displays are OFF, and FIG. 3B shows when all displays are ON. The numbers 1 thru 5 of the channel display 51 in FIG. 3 indicate the channel numbers assigned to each of the disc accommodating units 25.

In the initial state, the sub CPU 15 turns ON all of the accommodating-unit displays $50_1$–$50_5$. Also, the main CPU 14 controls the mechanism control circuit 9 so as to drive the motor 8, and detects the signal with the disc detector 6 to determine whether or not there is an optical disc 1 for each disc accommodating unit 25. As a result, it causes the sub CPU 15 to turn OFF the accommodating-unit displays $50_n$ that correspond to disc accommodating units 25 that were determined to have no optical disc 1. On the other hand, the main CPU 14 controls the servo circuit 4 so as to drive the motor 5. The optical pickup 2 irradiates a laser beam on the optical disc 1 and tries to read the TOC of the optical disc 1 with regard to the disc accommodating units 25 that were detected to have an optical disc 1. Then, in accordance with the information of the TOC, it determines whether the optical disc is a DVD video disc or a CD. The main CPU 14 causes the sub CPU 15 to change the display mode of the disc-type display 52 for the accommodating-unit displays $50_n$ that correspond to the disc accommodating units 25 depending on the judgment results.

FIGS. 3C thru 3F show the display states of the accommodating-unit display $50_1$ that correspond to the disc accommodating unit 25 to which channel number 1 is assigned. As shown in FIG. 3D, in the initial state, all of the lamps of the channel display 51 and disc-type display 52 of the accommodating-unit display $50_1$ are ON. The two segment displays 52a, 52b of the disc-type display 52 are both ON, and this state shows that it is unclear whether or not there is an optical disc accommodated in the disc accommodating unit 25 to which channel number 1 is assigned, and when there is an optical disc, whether it is a DVD disc or CD.

In a process in which the mechanism control circuit 9, in accordance with an instruction from the main CPU 14, controls the motor 8, rotates the turntable 24, and positions the disc accommodating unit 25 for channel number 1 in the disc reproduction unit, and when the disc detector 6 comprising the light emitting element 28 and light receiving element 29 detects that there is no optical disc 1 in the disc accommodating unit 25 for channel number 1, the main CPU 14, causes the sub CPU 15 to turn OFF all of the lamps of the channel display 51 and disc-type display 52 of the accommodating-unit display $50_1$ as shown in FIG. 3C.

On the other hand, when the disc detector 6 detects that there is an optical disc 1 in the disc accommodating unit 25 for channel number 1, the main CPU 14 determines the type of optical disc 1, and depending on the result determined, causes the sub CPU 15 to change the display mode of the disc-type display 52 of the accommodating-unit display $50_1$. For example, when the optical disc 1 is a DVD video disc, only the top display segment 52a goes ON as shown in FIG. 3E, and when it is a CD, only the bottom display segment 52b goes ON as shown in FIG. 3F.

FIG. 4 is a drawing showing another example (second example) of the display for a 5-disc carrousel changer type DVD video player which can reproduce both DVD video discs and CD and to which this embodiment of the invention is applied.

In this example, the display 17 of the DVD video player of this embodiment is the same as that shown in FIG. 3 except for the disc-type display 52'. The disc-type display 52' comprises three display segments 52'a, 52'b, 52'c that are located on the left, right and bottom of the channel display 51 so as to surround it.

In FIG. 4, FIG. 4A shows when all of the display lamps are OFF, and FIG. 4B shows when all of the display lamps are ON. FIG. 4C thru 4F show the display states of the accommodating-unit display $50_1$ that correspond to the disc accommodating unit 25 to which channel number 1 is assigned. In the initial state, only the channel display 51 of the accommodating-unit display $50_1$ is ON as shown in FIG. 4D. All of the three display segments 52'a–52'c of the disc-type display 52 are OFF, and this states indicates that it is unclear whether or not there is an optical disc accommodated in the disc accommodating unit 25 to which channel number 1 is assigned, and when there is an optical disc 25, whether it is a DVD disc or a CD.

When the disc detector 6 comprising the light emitting element 28 and light receiving element 29 detects that there is no optical disc 1 in the disc accommodating unit 25 for channel number 1 during the process when the mechanism control circuit 9 follows an instruction from the main CPU 14 and controls the motor 8, rotates the turntable 24 and positions the disc accommodating unit 25 for channel number 1 in the disc reproducing unit, the main CPU 14 causes the sub CPU 15 to also turn OFF the channel display 51 of the accommodating-unit display $50_1$ as shown in FIG. 4C.

On the other hand, when the disc detector 6 detects an optical disc 1 in the disc accommodating unit 25 for channel number 1, the main CPU 14 determines the type of 10 the optical disc 1 and then causes the sub CPU 15 to change the display mode of the disc-type display 52' of the accommodating-unit display $50_1$ to correspond with the result. For example, when the optical disc 1 is a DVD video disc, all of the three display segments 52'a–52'c 15 of the disc-type display 52' are turned ON as shown in FIG. 4E. When the optical disc 1 is a CD, only the bottom display segment 52'c is turned ON, as shown in FIG. 4F.

One embodiment of the present invention has been explained above.

In this embodiment, whether or not there is an optical disc in each disc accommodating unit 25, and the type of the optical disc are displayed in the same place for each disc accommodating unit 25. In specific, whether or not there is an optical disc, and the type of the disc are displayed by the channel display 51 that displays numbers (characters or symbols) corresponding to each of the disc accommodating units 25, and the disc-type display 52, 52' that is located in the vicinity of the channel display 51.

In this way, it is possible to simultaneously display in an easy-to-understand form for the user, for each disc accommodating unit 25, whether or not there is an optical disc, and when there is an optical disc, whether it is a DVD video disc or CD.

In the embodiment above, an example of a 5-disc carrousel changer type DVD video player was explained, however, the present invention is not limited to this example, and can be applied to any player capable of storing a plurality of discs. Also, in the embodiment above, an example of a DVD video player capable of reproducing both DVD discs and CD discs was explained, however, the present invention is not limited to this example, and can be applied to any player capable of reproducing a plurality of different kinds of recorded media (not limited to optical discs).

FIG. 5 is a drawing showing another example (third example) of the display for a 5-disc carrousel changer type DVD video player which can reproduce DVD video discs, CDs and V-CDs (Video-CD) to which this embodiment of the present invention is applied.

In this example, the display 17 of the DVD video player has the same configuration as that shown in FIG. 4. However, in this example in order to display distinguishably three kinds of discs, DVD video discs, CDs and V-CDs (video-CD), the display mode of the three display segments 52'a–52'c of the disc-type display 52' is different.

Figure 5A:
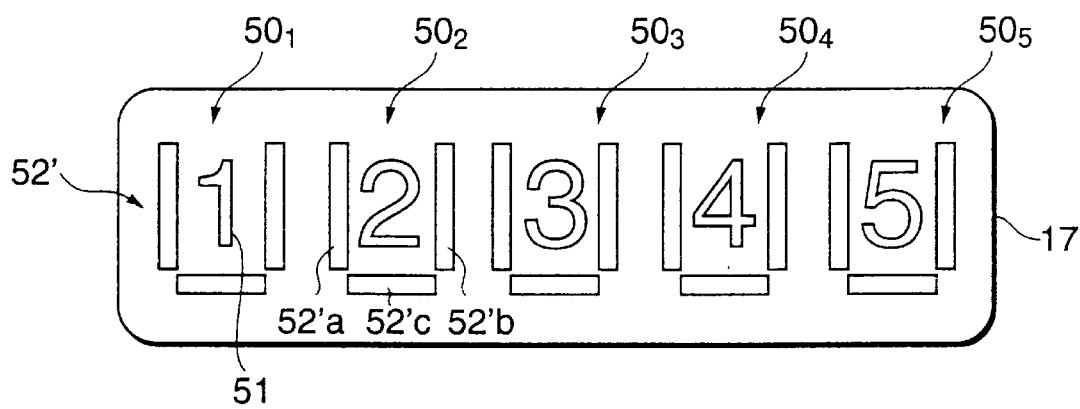
FIGS. 5A to 5G are drawings explaining an example (third example) of the DVD video player to which the present invention is applied.
Figure 5B:
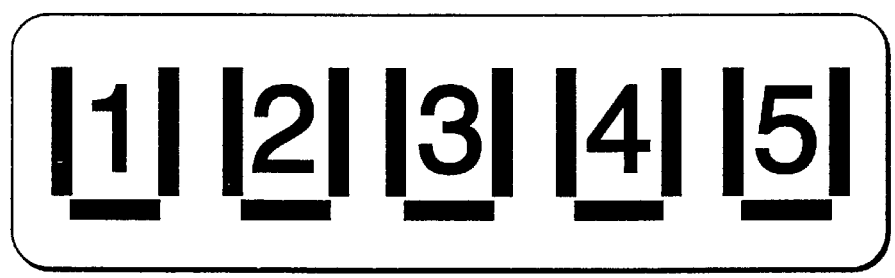
Figures 5C, 5D, 5E, 5F:
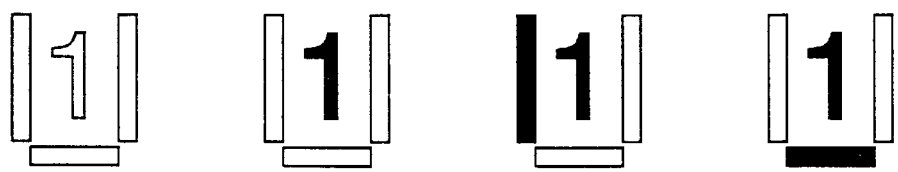
Figure 5G:

Namely, when the optical disc is a DVD video disc, only the left display segment 52'a of the three display segments 52'a–52'c of the disc-type display 52' goes ON as shown in FIG. 5E, and when the optical disc is a CD, only the bottom display segment 52'c goes ON as shown in FIG. 5F, and when the optical disc is a V-CD, only the right display segment 52'b goes ON as shown in FIG. 5G.

In this way, it is possible to simultaneously display in an easy-to-understand form for the user, for each disc accommodating unit 25, whether or not there is an optical disc, and when there is an optical disc, whether it is a DVD video disc, CD or V-CD.

It is possible to determine whether the optical disc is a DVD video disc, CD or V-CD as described below, for example.

That is, the main CPU 14 controls the motor 5 and optical pickup 2 through the servo circuit 4, and the optical pickup 2 irradiates a laser beam onto the optical disc 1. It then tries to read the TOC on the optical disc. The data processor 10 processes the signal output from the RF amplifier 3 and determines according to the result whether the optical disc is a DVD video disc, CD or V-CD.

Moreover, in the above embodiment, the disc-type display 52, 52' comprises a plurality of display segments, and the type of the optical disc is displayed by changing the mode of the display segments. However, the present invention is not limited to this. For example, the disc-type display 52 could comprise a single display capable of displaying in colors, and the type of the optical disc 1 could be displayed by changing the color of the display. Also, the channel display 51 could be a single display capable of displaying in colors, by displaying the type of optical disc by changing the color of the display when the channel display is ON so that it is possible for the channel display 51 to also function as the disc-type display 52.

Also, in the above embodiment, as shown in FIG. 3 thru FIG. 5, a case of five accommodating-unit displays 50, thru 50₅ each corresponding to the five disc accommodating units 25, respectively, and being arranged in one horizontal row, was explained. However, the present invention is not limited to this case. The displays could be arranged in one vertical row, or in more than one row.

Figure 6:
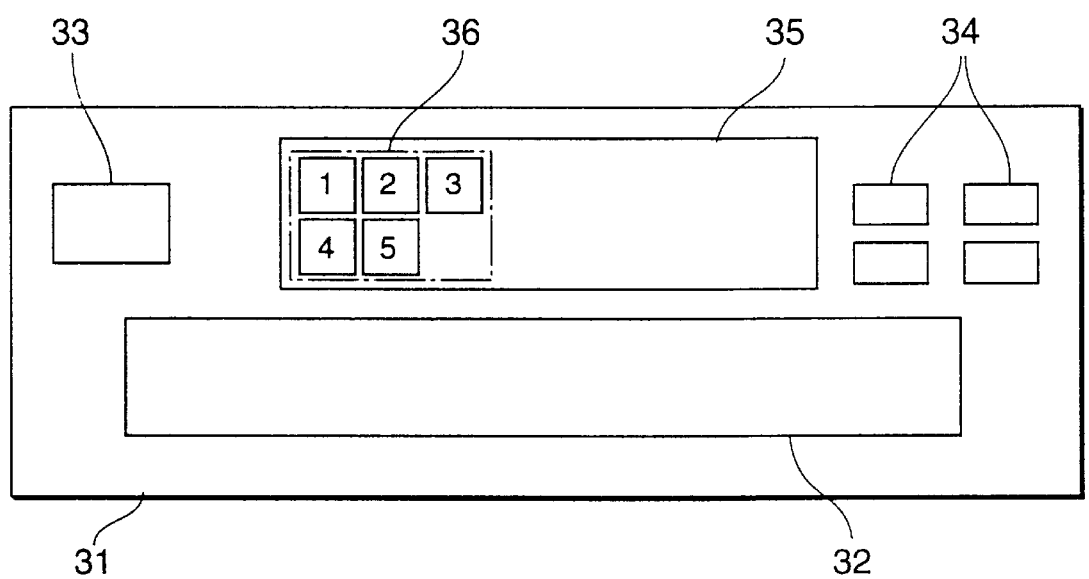
FIG. 6 is a drawing explaining one example of a front panel of the DVD video player to which the present invention is applied.
Figure 7A:
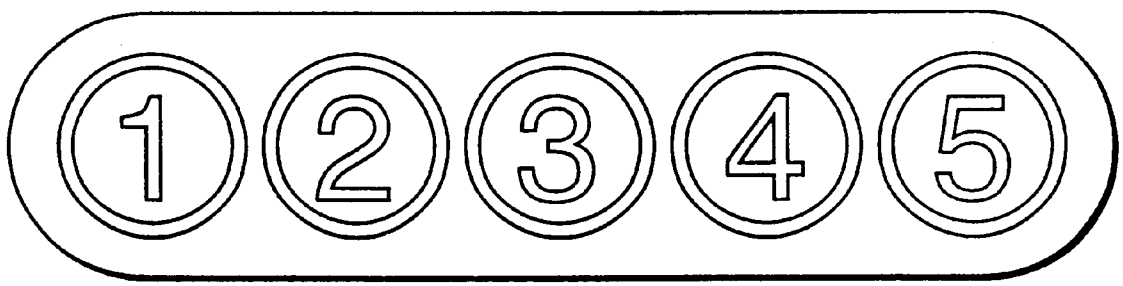
FIGS. 7A to 7C are drawings explaining a display of a conventional optical disc reproducing apparatus.
Figure 7B:
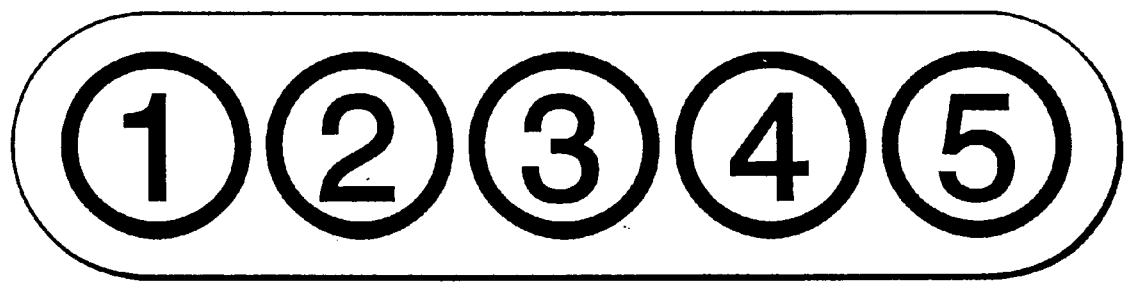
Figure 7C:
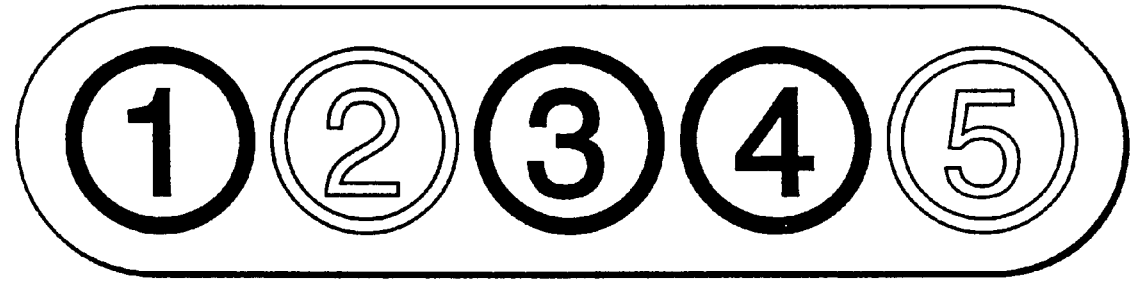

FIG. 6 shows an example of a front panel for an optical disc reproducing apparatus to which the present invention is applied. In the figure, reference numeral 31 refers to a front panel 31, 32 to a disc tray, 33 to a power switch, 34 to control buttons, 35 to a display, and 36 to a disc display. Here, the number of channels of disc accommodating units for accommodating the optical discs is five, the same as in the embodiment described above.

The front face of the disc tray 32 for inserting the optical disc, the power switch 33 and control buttons 34 are arranged on the front panel 31. In the display 35, there is provided a display area of a disc display 36, and there are arranged display units indicating five channels in two rows. The accommodating-unit display $50_1$ thru $50_5$ is as explained in connection with FIGS. 3 to 5.

With the present invention, as explained above, it is possible to simultaneously display in an easy-to-understand format for the user, for a recorded medium accommodating unit, whether or not it contains recorded medium, and the type of recorded medium, for a recorded medium reproducing apparatus that is capable of loading a plurality of various types of recorded media.

What is claimed is:

1. A recorded medium reproducing apparatus capable of loading a plurality of recorded media of various kinds, comprising:
    a front panel formed unitary with the recorded medium reproducing apparatus,
    holding means having a plurality of accommodating units for accommodating recorded media,
    recorded medium detection means for detecting whether or not there is a recorded medium accommodated in each of said accommodating units,
    medium-type detection means for detecting the kind of recorded medium that was detected to be accommodated in said accommodating units by said recorded medium detection means, and
    display means for displaying detection results of said recorded medium detection means and said medium-type detection means with regard to each of said plurality of accommodating units, respectively, wherein:
        said display means is provided to said front panel and each of said display means comprises a first display portion for displaying the detection result of said recorded medium detection means by two display modes and a second display portion for displaying the detection result of said medium-type detection means by two display modes, which are located in close proximity to each other and provided for each of the plurality of accommodating units.

2. The recorded medium reproducing apparatus of claim 1, wherein:
    each of said first display portion displays whether or not the recorded medium is accommodated in said accommodating unit that corresponds to the first display portion concerned, and displays a channel number assigned to said accommodating unit that correspond to the first display portion.

3. The recorded medium reproducing apparatus of claim 1, wherein:
    each of said second display portion comprises a plurality of display segments, and by changing the display mode of said display segments for each type of said recorded medium, displays the kind of the recorded medium that is accommodated in said accommodating unit corresponding to said second display portion concerned.

4. The recorded medium reproducing apparatus of claim 3, wherein said second display portion is located so as to surround said first display portion that corresponds to said accommodating unit.

5. A recorded medium reproducing apparatus capable of loading a plurality of recorded media of various kinds, comprising:
    holding means having a plurality of accommodating units for accommodating recorded media,
    recorded medium detection means for detecting whether or not there is a recorded medium accommodated in each of said accommodating units,
    medium-type detection means for detecting the kind of recorded medium that was detected to be accommodated in said accommodating units by said recorded medium detection means, and display means for displaying detection results of said recorded medium detection means and said medium-type detection means with regard to each of said plurality of accommodating units, respectively, wherein:
each of said display means comprises a first display portion for displaying the detection result of said recorded medium detection means and a second display portion for displaying the detection result of said medium-type detection means, which are located in close proximity to each other and provided for each of the plurality of accommodating units, and wherein each of said first display portion displays whether or not the recorded medium is accommodated in said accommodating unit that corresponds to the first display portion concerned, and displays a channel number assigned to said accommodating unit that corresponds to the first display portion.

6. A recorded medium reproducing apparatus capable of loading a plurality of recorded media of various kinds, comprising:
holding means having a plurality of accommodating units for accommodating recorded media,
recorded medium detection means for detecting whether or not there is a recorded medium accommodated in each of said accommodating units,
medium-type detection means for detecting the kind of recorded medium that was detected to be accommodated in said accommodating units by said recorded medium detection means, and
display means for displaying detection results of said recorded medium detection means and said medium-type detection means with regard to each of said plurality of accommodating units, respectively, wherein:
each of said display means comprises a first display portion for displaying the detection result of said recorded medium detection means and a second display portion for displaying the detection result of said medium-type detection means, which are located in close proximity to each other and provided for each of the plurality of accommodating units, and wherein each of said second display portions comprises a plurality of display segments, and by changing the display mode of said display segments for each type of said recorded medium, displays the kind of the recorded medium that is accommodated in said accommodating unit corresponding to said second display portion concerned.

7. The recorded medium reproducing apparatus of claim 6, wherein said second display portion is located so as to surround said first display portion that corresponds to said accommodating unit.

* * * * *

UNITED STATES PATENT AND TRADEMARK OFFICE
CERTIFICATE OF CORRECTION

PATENT NO. : 6,625,097 B1
DATED : September 23, 2003
INVENTOR(S) : Sakurai

It is certified that error appears in the above-identified patent and that said Letters Patent is hereby corrected as shown below:

<u>Title page,</u>
Item [73], Assignee, "Nippon Columbia Co., Ltd." should read -- Denon, Ltd. --.

Signed and Sealed this

Fourth Day of May, 2004

JON W. DUDAS
*Acting Director of the United States Patent and Trademark Office*